United States Patent
Blasius

(10) Patent No.: US 12,052,364 B2
(45) Date of Patent: *Jul. 30, 2024

(54) SYSTEMS AND METHODS FOR INTELLIGENTLY CONSTRUCTING, TRANSMITTING, AND VALIDATING SPOOFING-CONSCIOUS DIGITALLY SIGNED WEB TOKENS USING MICROSERVICE COMPONENTS OF A CYBERSECURITY THREAT MITIGATION PLATFORM

(71) Applicant: Expel, Inc., Herndon, VA (US)

(72) Inventor: Matthew Blasius, Grand Prairie, TX (US)

(73) Assignee: Expel, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,552

(22) Filed: Dec. 19, 2023

(65) Prior Publication Data

US 2024/0121096 A1   Apr. 11, 2024

Related U.S. Application Data

(63) Continuation of application No. 18/226,645, filed on Jul. 26, 2023, now Pat. No. 11,895,238.

(60) Provisional application No. 63/415,020, filed on Oct. 11, 2022, provisional application No. 63/398,001, filed on Aug. 15, 2022.

(51) Int. Cl.
*H04L 9/40* (2022.01)
*H04L 9/32* (2006.01)

(52) U.S. Cl.
CPC .......... *H04L 9/3213* (2013.01); *H04L 9/3247* (2013.01); *H04L 9/40* (2022.05)

(58) Field of Classification Search
CPC ............ H04L 9/13; H04L 9/40; H04L 9/3247
See application file for complete search history.

(56) References Cited

U.S. PATENT DOCUMENTS

| | | | |
|---|---|---|---|
| 10,892,984 B1 | 1/2021 | Satton et al. | |
| 11,316,844 B2* | 4/2022 | Krishnaiah | G06Q 20/4014 |
| 11,811,845 B2* | 11/2023 | Decenzo | H04L 67/12 |
| 2017/0111336 A1* | 4/2017 | Davis | H04L 63/029 |
| 2017/0169425 A1 | 6/2017 | Metral | |

(Continued)

*Primary Examiner* — Ghodrat Jamshidi
(74) *Attorney, Agent, or Firm* — Padowithz Alce; Chandler Scheitlin; Alce PLLC

(57) ABSTRACT

A system and method for using digitally signed web tokens to securely share sensitive data includes identifying an API request that includes an authorization header comprising authentication data; assessing the authentication data of the API request against a corpus of valid authentication data; identifying the authentication data as valid authentication data and a target entity that corresponds to the authentication data; obtaining a set of permissions associated with the target entity; generating a digitally signed protobuf web token that includes a representation of the target entity and a representation of the set of permissions associated with the target entity; and based on the generation of the digitally signed protobuf web token: adapting the API request to an adapted API request that includes a header component comprising the digitally signed protobuf web token; and transmitting the adapted API request to a target API-processing service.

18 Claims, 8 Drawing Sheets

(56) References Cited

U.S. PATENT DOCUMENTS

| | | |
|---|---|---|
| 2018/0182052 A1 | 6/2018 | Panagos |
| 2019/0068622 A1 | 2/2019 | Lin et al. |
| 2019/0306235 A1* | 10/2019 | Veale .................... H04L 63/123 |
| 2020/0228629 A1 | 7/2020 | Li |
| 2022/0092713 A1* | 3/2022 | Bracken ................ H04L 67/567 |
| 2022/0188170 A1 | 6/2022 | Smith |
| 2022/0335518 A1 | 10/2022 | Wellmann et al. |
| 2022/0345374 A1* | 10/2022 | Venkata .................. H04L 41/40 |
| 2022/0345568 A1* | 10/2022 | Gonzalez .............. H04M 3/242 |
| 2023/0376811 A1* | 11/2023 | Palanki .................... G06N 7/01 |

* cited by examiner

200

Configuring Algorithmic Structures of Microservice Components S210

Receiving a Subscriber-Initiated Request S220

Intelligently Selecting a Web Tokenization Scheme S230

Constructing a Digitally Signed Web Token S240

Routing and Validating a Digitally Signed API Request S250

FIGURE 2

SYSTEMS AND METHODS FOR INTELLIGENTLY CONSTRUCTING, TRANSMITTING, AND VALIDATING SPOOFING-CONSCIOUS DIGITALLY SIGNED WEB TOKENS USING MICROSERVICE COMPONENTS OF A CYBERSECURITY THREAT MITIGATION PLATFORM

CROSS-REFERENCE TO RELATED APPLICATIONS

This application is a continuation of U.S. patent application Ser. No. 18/226,645, filed 26 Jul. 2023, which claims the benefit of U.S. Provisional Application No. 63/415,020, filed on 11 Oct. 2022, and U.S. Provisional Application No. 63/398,001, filed on 15 Aug. 2022, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE INVENTION(S)

In one embodiment, a method for using digitally signed web tokens to securely share sensitive data within microservice components of a cybersecurity event detection and response service includes identifying, via an application programming interface (API) gateway, an API request that includes an authorization header comprising authentication data; assessing, via an authentication service of the API gateway, the authentication data of the API request against a corpus of valid authentication data of the cybersecurity event detection and response service based on the identifying of the API request; identifying, via the authentication service of the API gateway, (a) the authentication data as valid authentication data and (b) a target entity that corresponds to the authentication data based on the assessment of the authentication data against the corpus of valid authentication data; obtaining, via an authorization service of the API gateway, a set of permissions that the target entity is authorized to perform within the cybersecurity event detection and response service based on searching a corpus of authorization data using an identifier of the target entity as a search parameter; generating, at the authorization service of the API gateway, a digitally signed protobuf web token that includes (1) a representation of the target entity and (2) a representation of the set of permissions associated with the target entity based on the obtaining of the set of permissions; and based on the generation of the digitally signed protobuf web token: adapting, via one or more processors, the API request to an adapted API request, wherein the adapted API request includes a header component comprising the digitally signed protobuf web token; and transmitting, via a network, the adapted API request to a target API-processing service that automatically processes or automatically handles the adapted API request.

In one embodiment, the corpus of valid authentication data includes one or more pieces of genuine authentication data of each subscriber associated with the cybersecurity event detection and response service, and each of the one or more pieces of genuine authentication data provides a subject subscriber a capability of accessing at least a portion of the cybersecurity event detection and response service.

In one embodiment, the authentication data includes an API key associated with the target entity, the assessment of the authentication data against the corpus of valid authentication data includes assessing the API key against a list of valid API keys stored in the corpus of valid authentication data, and the identification of the authentication data as valid authentication data is further based on a determination that the API key is equivalent to one of the valid API keys of the list of valid API keys.

In one embodiment, each valid API key of the list of valid API keys corresponds to a distinct entity subscribing to the cybersecurity event detection and response service and is authorized for use within the cybersecurity event detection and response service.

In one embodiment, the generation of the digitally signed protobuf web token includes generating a header object, wherein the generation of the header object includes: encoding the header object based on a protobuf-header encoding protocol defined by the authorization service of the API gateway, wherein the header object, when encoded, includes instructions for a downstream service or downstream component of the cybersecurity event detection and response service to decode and validate the digitally signed protobuf web token; the method further includes: serializing, via a serialization algorithm, the header object into a serialized header byte array.

In one embodiment, the generation of the digitally signed protobuf web token includes generating a payload object, wherein the generation of the payload object includes: encoding the payload object based on a protobuf-payload encoding protocol defined by the authorization service of the API gateway, wherein the payload object, when encoded, includes the representation of the target entity and the representation of the set of permissions associated with the target entity; the method further includes: serializing, via the serialization algorithm, the payload object into a serialized payload byte array.

In one embodiment, the generation of the digitally signed protobuf web token includes generating a signature object, wherein the generation of the signature object includes: generating, via the one or more processors, a signature byte array based on a concatenation of the serialized header byte array and the serialized payload byte array; the method further includes: generating a cryptographic signature of the signature byte array based on providing, as input, the signature byte array to a target asymmetrical signing algorithm.

In one embodiment, the method further includes generating an encoded header based on providing the serialized header byte array, as input, to a target encoding algorithm; generating an encoded payload based on providing the serialized payload byte array, as input, to the target encoding algorithm; and generating an encoded signature based on providing the cryptographic signature, as input, to the target encoding algorithm, wherein the digitally signed protobuf web token includes the encoded header, the encoded payload, and the encoded signature.

In one embodiment, the method further includes automatically determining, via the target API-processing service, the digitally signed protobuf web token as a valid web token based on the digitally signed protobuf web token satisfying web token decoding and validation criteria defined by the target API-processing service, wherein the target API-processing service automatically processes or automatically handles the adapted API request based on the automatic determination.

In one embodiment, the method further includes identifying, via the authorization service of the API gateway, that the target entity corresponds to a multi-tenant user; identifying, via the one or more processors, a size-conscious web tokenization scheme based on the identification of the target entity as the multi-tenant user, wherein the generation of the digitally signed protobuf web token is further based on the size-conscious web tokenization scheme.

In one embodiment, the method further includes based on the target API-processing service receiving the adapted API request: automatically decoding and validating, via the target API-processing service, the digitally signed protobuf web token using a set of computer-executable protobuf web token decoding and validation instructions of the target API-processing service, wherein the target API-processing service is configured to perform the decoding and validating of the digitally signed protobuf web token without creating a subsequent API request to another internal service component and external service component of the cybersecurity event detection and response service.

In one embodiment, the method further includes executing the adapted API request based on the transmission of the adapted API request to the target API-processing service; and in response to the execution of the adapted API request: enabling the target entity access to a plurality of tenants of the cybersecurity event detection and response service.

In one embodiment, the method further includes executing the adapted API request based on the transmission of the adapted API request to the target API-processing service; and in response to the execution of the adapted API request: selectively returning a corpus of security data based on a context of the adapted API request.

In one embodiment, the method further includes executing the adapted API request based on the transmission of the adapted API request to the target API-processing service; and in response to the execution of the adapted API request: automatically mitigating a compromised digital asset of the target entity that resolves or mitigates a cybersecurity threat associated with the compromised digital asset.

In one embodiment, the target entity corresponds to one of a user, an API client, and a service account.

In one embodiment, a computer-implemented method for using digitally signed web tokens to securely share sensitive data within microservice components of a cybersecurity event detection and response service includes identifying, via an application programming interface (API) gateway, an API request that includes an authorization header comprising authentication data; assessing, via an authentication service of the API gateway, the authentication data of the API request against a corpus of valid authentication data of the cybersecurity event detection and response service based on the identifying of the API request; identifying, via the authentication service of the API gateway, (a) the authentication data as valid authentication data and (b) a target entity that corresponds to the authentication data based on the assessment of the authentication data against the corpus of valid authentication data; obtaining, via an authorization service of the API gateway, a set of permissions that the target entity is authorized to perform within the cybersecurity event detection and response service based on searching a corpus of authorization data using an identifier of the target entity as a search parameter; generating, at the authorization service of the API gateway, a digitally signed protobuf web token that includes (1) a representation of the target entity and (2) a representation of the set of permissions associated with the target entity based on the obtaining of the set of permissions; and based on the generation of the digitally signed protobuf web token: adapting, via one or more processors, the API request to an adapted API request, wherein the adapted API request includes a header component comprising the digitally signed protobuf web token; and transmitting, via a network, the adapted API request to a target API-processing service of the cybersecurity event detection and response service that automatically processes or automatically handles the adapted API request.

In one embodiment, the generation of the digitally signed protobuf web token further includes selecting a target web tokenization scheme of a plurality of distinct web tokenization schemes based on one or more characteristics of the target entity; the computer-implemented method further comprising: using the target web tokenization scheme to generate the digitally signed protobuf web token.

In one embodiment, the generating the digitally signed protobuf web token further includes selecting a target web tokenization scheme of a plurality of distinct web tokenization schemes based on one or more characteristics of the API request; the computer-implemented method further comprising: using the target web tokenization scheme to generate the digitally signed protobuf web token.

In one embodiment, the set of permissions includes a plurality of read and write permissions that the target entity is authorized to perform within the cybersecurity event detection and response service.

In one embodiment, the authentication data includes a username-password pair associated with the target entity, the assessment of the authentication data against the corpus of valid authentication data includes assessing the username-password pair against a list of valid username-password pairs stored in the corpus of valid authentication data, and the identification of the authentication data as valid authentication data is further based on a determination that the username-password pair is equivalent to one of the valid username-password pairs of the list of valid username-password pairs.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
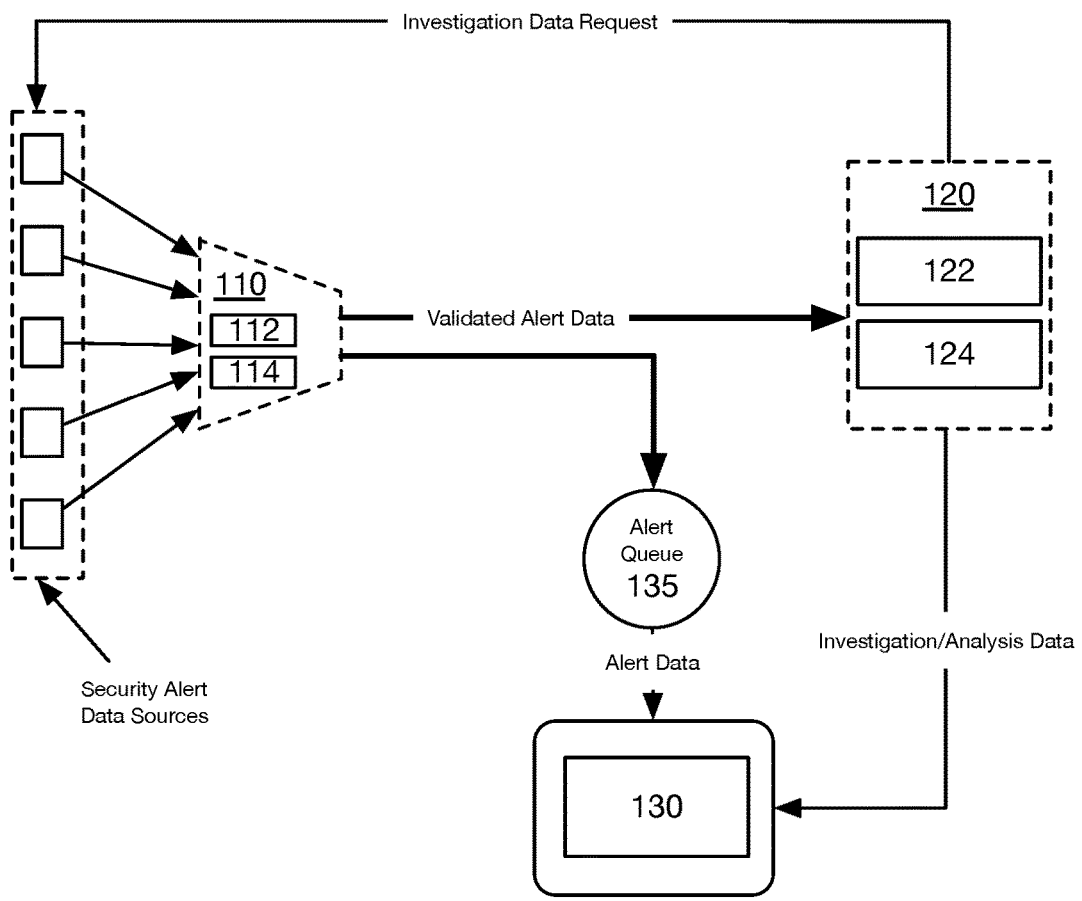
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100, a cybersecurity event detection and response service, and/or a cybersecurity threat mitigation platform.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Intelligently Constructing, Transmitting, and/or Validating Digitally Signed Web Tokens As shown in FIG. 2, a method 200 for intelligently constructing, transmitting, and validating digitally signed web tokens may include configuring algorithmic structures of microservice components S210, receiving a subscriber-initiated request S220, constructing a digitally signed web token based on the subscriber-initiated request S240, and routing and validating a digitally signed API request S250. The method may optionally include intelligently selecting a web tokenization scheme S230.

2.10 Configuring Algorithmic Structures of Microservice Components

S210, which includes configuring algorithmic structures of microservice components, may function to configure one or more microservice components of the cybersecurity event detection and response service to have a capability of constructing, transmitting, and/or validating one or more types of digitally signed web tokens. In a preferred embodiment, configuring the one or more microservice components to construct, transmit, and/or validate digitally signed web tokens may prevent malicious users from accessing sensitive (subscriber) data included within digitally signed web tokens and misappropriating the sensitive subscriber data to perform digital fraud activities (e.g., spoofing-type digital fraud activities). It shall be recognized that the phrase "microservice components" may be interchangeably referred to herein as a "microservice module", a "component", a "service" and/or a "module" of the system or service implementing the method 200.

In one or more embodiments, a structure of a digitally signed web token may include a plurality of distinct API processing components or parts (e.g., <header>.<payload>.<signature>). For instance, in a non-limiting example, a structure of a digitally signed web token may include a first component (e.g., a header object) that may include decoding and validation instructions that may inform a target microservice component (in receipt of a digitally signed web token) of a scheme to decode and/or validate the digitally signed web token. Additionally, in such non-limiting example, the structure of the digitally signed web token may include a second component (e.g., a payload object) that may include data (e.g., subscriber authentication data, subscriber authorization data, subscriber identification data, token expiration data, token creation data, subscriber role data, claims, etc.) to which the digitally signed web token may transport from a source (or initial) microservice component to a destination (or target) microservice component. Additionally, in such a non-limiting example, the structure of the digitally signed web token may include a third component (e.g., a signature object) that may include a signed representation of the header object and the payload object.

Configuring Microservice Components to Construct Digitally Signed Web Tokens

In one or more embodiments, S210 may function to implement one or more (e.g., web) token generation programming libraries that may include a set of computer-executable instructions that, when executed, executes an automated sequence of tasks that includes constructing and encoding digitally signed web tokens. It shall be noted that implementing the one or more (e.g., web) token generation programming libraries may accelerate a configuration of at least a subset of the microservice components underpinning a service or system implementing the method 200 to securely share data (e.g., authorization data, authentication data, sensitive security data, etc.) within and/or between microservice components of the cybersecurity event detection and response service.

In a first implementation, S210 may function to implement one or more token generation programming libraries that may extend an algorithmic structure of one or more microservice components (of the cybersecurity event detection and response service) to construct and/or encode binary-based (digitally signed) web tokens (e.g., Protobuf Web Tokens (PWT), digitally signed protobuf web tokens, etc.). In one or more embodiments of such implementation and as shown generally by way of example in FIG. 3 and FIG. 4, constructing a binary-based (digitally signed) web token (e.g., digitally signed protobuf web token or the like) may include, but not limited to, constructing and serializing a header object into a distinct binary (byte) array (e.g., a header byte array); constructing and serializing a payload object into a distinct binary (byte) array (e.g., a payload byte array); concatenating the header byte array and the payload byte array into a concatenated binary (byte) array; executing a target signing algorithm against the concatenated binary (byte) array to generate a digital hash signature representation of the concatenated binary (byte) array; encoding the header byte array, the payload byte array, and the digital signature into a target encoding format (e.g., a base64url encoding, etc.); and generating a (e.g., delimited) string of data (e.g., textual data and/or numerical data) that includes the encoded header byte array, the encoded payload byte array, and the encoded digital hash signature of the concatenated binary (byte) array (e.g., <header>.<payload>.<signature>).

Stated another way, in one or more embodiments, S210 may function to encode a subset of microservice components of the cybersecurity event detection and response service with a set of computer-executable web token construction instructions that provides each microservice component of the subset of microservice components a capability of constructing, generating, and/or encoding one or more types of digitally signed web tokens (e.g., digitally signed protobuf web tokens). For instance, in a non-limiting example, based on encoding a first microservice component (e.g., an authorization service of the cybersecurity event detection and response service) with a first set of computer-executable web token construction instructions (e.g., PWT construction instructions), the first microservice component may be configured to automatically construct, generate, and/or encode a digitally signed protobuf web token based on the first set of computer-executable web token construction instructions (e.g., PWT construction instructions). Additionally, or alternatively, in a non-limiting example, based on encoding a second microservice component (e.g., a downstream microservice component, an upstream microservice component, etc.) with a second set of computer-executable web token construction instructions (e.g., PWT construction instructions), the second microservice component may be configured to automatically construct, generate, and/or encode a digitally signed protobuf web token based on the second set of computer-executable web token construction instructions (e.g., PWT construction instructions). It shall be noted that, in one or more embodiments, the first set of computer-executable web token construction instructions (e.g., PWT construction instructions) of the first microservice component may be the same or different than the second set of computer-executable web token construction instructions (e.g., PWT construction instructions) of the second microservice component. In this way, the second microservice component may be configured to encode a payload component of the digitally signed protobuf web token to have additional, fewer, or different claims (e.g., attributes, properties, etc.) with respect to the first microservice component.

Additionally, or alternatively, in a second implementation, S210 may function to implement one or more token generation programming libraries that may extend an algorithmic structure of one or more microservice components of the cybersecurity event detection and response service to construct and/or encode JSON Web Tokens (JWT) in analogous ways described above.

Configuring Microservice Components to Validate Digitally Signed Web Tokens

Additionally, or alternatively, in one or more embodiments, S210 may function to implement one or more (e.g., web) token validation programming libraries that may enable a target microservice component in receipt of a digitally signed web token to automatically decode and/or validate the subject digitally signed web token. It shall be noted that the one or more token validation programming libraries may comprise a set of computer-executable instructions that, when executed, executes an automated sequence of tasks that may include decoding and validating digitally signed web tokens. It shall be noted that S210 may function to implement or instantiate the one or more token validation programming libraries for at least a subset of the microservice components underpinning a service or system implementing the method 200.

Stated another way, in one or more embodiments, S210 may function to encode a subset of microservice components of the cybersecurity event detection and response service with a set of computer-executable web token decoding and validation instructions that provides each microservice component of the subset of microservice components a capability of decoding and validating digitally signed web tokens (e.g., digitally signed protobuf web tokens).

In a first implementation, S210 may function to configure an algorithmic structure of one or more microservice components (e.g., an authorization service or the like) of the cybersecurity event detection and response service to decode and/or validate binary-based (digitally signed) web tokens (e.g., Protobuf Web Tokens (PWT)). In such implementation, enabling microservice components to decode and validate binary-based (digitally signed) web tokens (e.g., digitally signed protobuf web tokens) may enable a subject microservice with confirming or disconfirming an authenticity of a target binary-based (digitally signed) web token to ensure the web token does not pose a security risk to the service or system implementing the method 200. Stated another way, the digitally signed protobuf web token may be used to verify the authenticity of a subject sender to ensure that the message associated with the token has not been altered or modified which, in turn, provides a microservice component in receipt of the digitally signed protobuf web token confidence that the digitally signed protobuf web token has not been altered or manipulated by an unauthorized entity.

Figure 5:
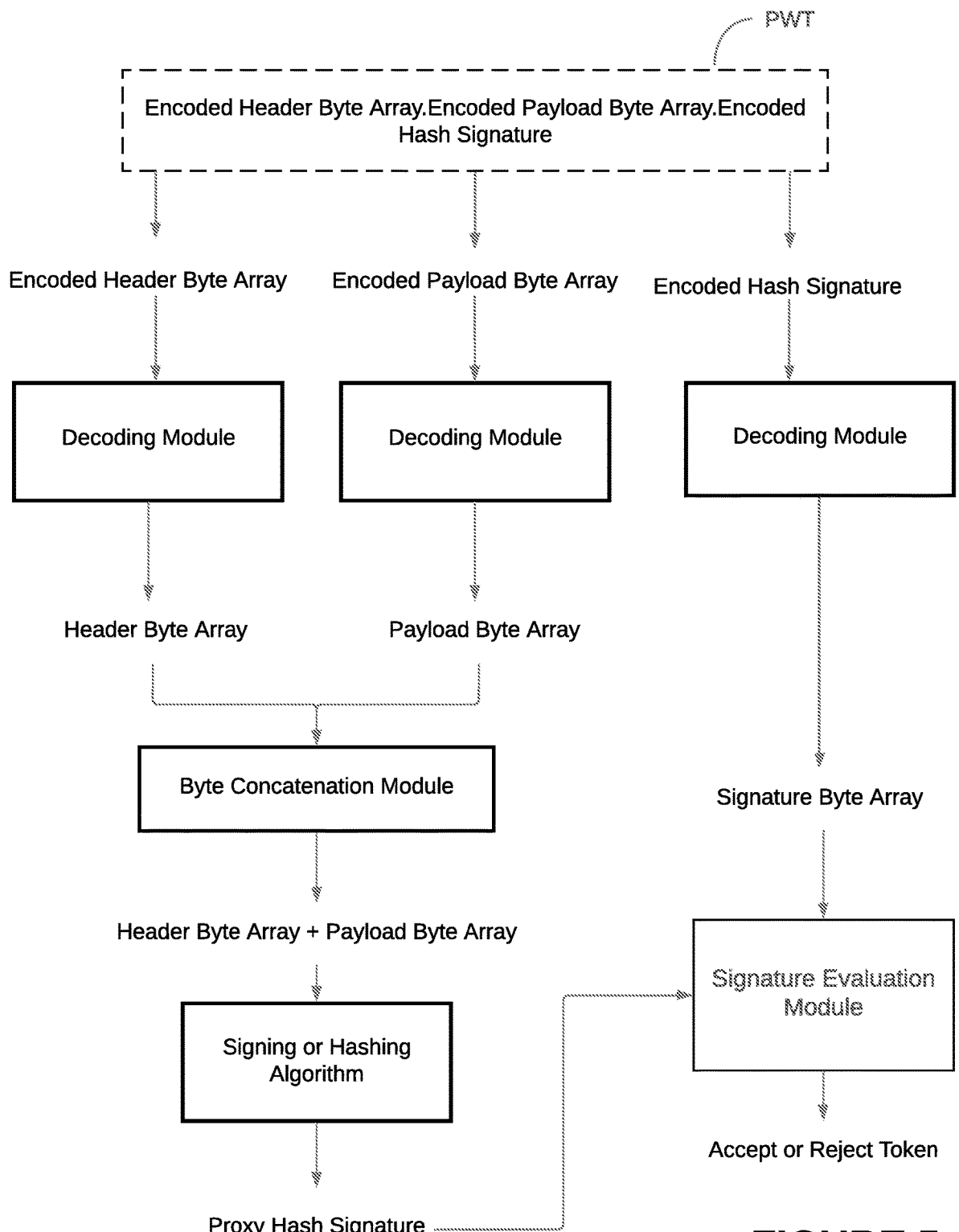
FIG. 5 illustrates an example schematic of validating a digitally signed protobuf web token (PWT) in accordance with one or more embodiments of the present application.
Figure 6:
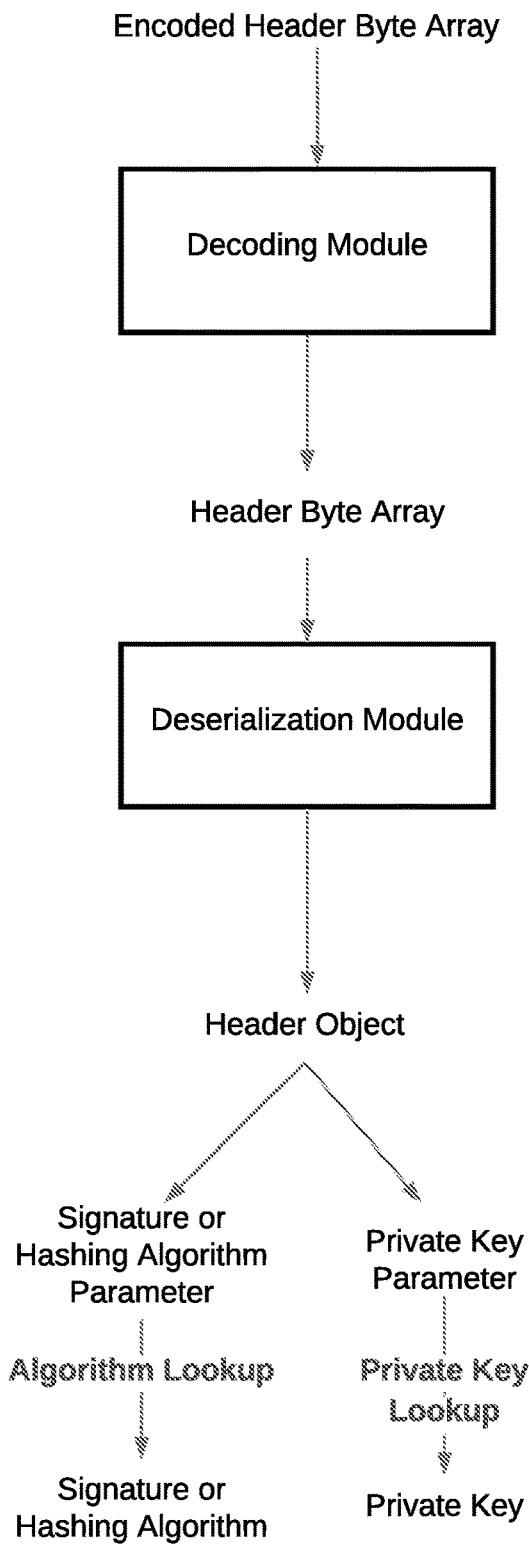
FIG. 6 illustrates an example schematic of deserializing a header byte array of a digitally signed web token (PWT) in accordance with one or more embodiments of the present application.

In one or more embodiments of such implementation and as shown generally by way of example in FIG. 5 and FIG. 6, decoding and validating a subject binary-based (digitally signed) web token (e.g., PWT, digitally signed protobuf web token, or the like) may include, but not limited to, partitioning the subject binary-based digitally signed web token into constitutional/foundational elements (e.g., the encoded header byte array (e.g., encoded header, header object, etc.), the encoded payload byte array (e.g., encoded payload, payload object), and the encoded digital signature (e.g., signature object, encoded hash signature); decoding the header object into a header byte array and de-serializing the header byte array to identify one or more attributes included in the header object; decoding the payload object into a payload byte array; decoding the signature object into a signature byte array; concatenating the header byte array and the payload byte array and generating a proxy signature based on the concatenated binary (byte) array; and determining if the proxy signature matches the baseline or original signature of the binary-based digitally signed web token.

Additionally, or alternatively, in a second implementation, S210 may function to implement one or more programming libraries that may extend an algorithmic structure of one or more microservice components of the cybersecurity event detection and response service to decode and/or validate JSON Web Tokens (JWT) in analogous ways described above.

2.20 Receiving Subscriber-Initiated Requests and/or Front-End API Requests

S220, which includes receiving subscriber-initiated requests, may function to identify or receive a request by a subscriber attempting to perform one or more digital activities using the cybersecurity threat detection and response service. In a preferred embodiment, based on or in response to identifying the subscriber request, the system or service implementing the method 200 may function to construct and/or issue a digitally signed web token (e.g., binary-based digitally signed web token (PWT), JWT, or the like) to the subscriber associated with the request, as described in more detail herein.

In one or more embodiments, the subscriber-initiated request may include authentication data associated with the subscriber that the service or system may attempt to identify, authenticate, and/or validate. That is, in or more embodiments, the authentication data of the subscriber-initiated request may be used by the system or service to determine whether the subscriber is valid. For instance, in a non-limiting example, the authentication data that may be included within a subject subscriber-initiated request may include an API key associated with the subscriber. In the same or another non-limiting example, the authentication data that may be included within a subject subscriber-initiated request may be a username and password pair associated with the subscriber.

In a first implementation, S220 may function to identify or receive the subscriber-initiated request in response to the subscriber attempting to log into/access the security threat mitigation user interface 130 of the system or service 100.

Additionally, or alternatively, in a second implementation, based on a subscriber successfully logging into or accessing the security threat mitigation user interface 130, S220 may function to identify or receive a subscriber-initiated request in response to the subscriber attempting to navigate to one or more user interfaces provided by the system or service implementing the method 200.

Additionally, or alternatively, in a third implementation, S220 may function to receive and/or obtain, via an application programming interface (API) gateway of the cybersecurity event detection and response service, an API request that includes an authorization header comprising authentication data (e.g., an API key, a username-password pair, etc.).

It shall be noted that the above-described implementations of subscriber-initiated requests are not intended to be limiting and that other types or forms of subscriber requests and/or front-end API requests may be identified by S220 without departing from the scope of the invention(s).

2.30 Intelligently Selecting a Web Tokenization Scheme

S230, which optionally includes selecting a web tokenization scheme, may function to select the web tokenization scheme of a plurality of distinct web tokenization schemes based on one or more characteristics of the subscriber-initiated request. A web tokenization scheme, as generally referred to herein, may include a set of computer-executable instructions that, when executed, executes an automated sequence of tasks that may include constructing a digitally signed web token in a distinct structure or format as defined by the web tokenization scheme. It shall be noted that, in some embodiments, the cybersecurity event detection and response service, a microservice component of the cybersecurity event detection and response service configured to construct digitally signed web tokens, and/or any other suitable component of the cybersecurity event detection and response service may automatically select a web tokenization scheme.

In one or more embodiments, S230 may function to select a target web tokenization scheme from a plurality of distinct web tokenization schemes based on one or more characteristics associated with a subscriber-initiated request satisfying at least one criterion of the target web tokenization scheme. In such embodiments, a distinct set of tokenization criteria (or criterion) may be defined for each distinct web tokenization scheme of the plurality of distinct web tokenization schemes.

For instance, in a non-limiting example, a first distinct set of tokenization criteria (or criterion) may be defined for a first web tokenization scheme and a second distinct set of tokenization criteria (or criterion) may be defined for a second tokenization scheme, etc. It shall be noted that, in one or more embodiments, S220 may function to automatically select, by one or more computers, one of a plurality of distinct tokenization schemes based on one or more characteristics of a target subscriber-initiated request satisfying tokenization criterion of the target web tokenization scheme.

Stated another way, in one or more embodiments, a microservice component (e.g., an authentication service, etc.) of the cybersecurity event detection and response service, may function to select a target web tokenization scheme of a plurality of distinct web tokenization schemes based on one or more characteristics of the API request satisfying criteria of the target web tokenization scheme.

Additionally, or alternatively, in a variant embodiment, a microservice component (e.g., an authorization service, etc.) may function to select a target web tokenization scheme of a plurality of distinct web tokenization schemes based on one or more characteristics of the target entity satisfying criteria of the target web tokenization scheme. For instance, in a non-limiting example, an authorization service of an API gateway of the cybersecurity event detection and response service may function to identify that a target entity associated with a subject API request corresponds to a multi-tenant user and, in turn, the authorization service may function to select a size-conscious web tokenization scheme (e.g., a digitally signed protobuf web tokenization scheme, protocol buffer web tokenization scheme, etc.) based on the identification of the target entity as the multi-tenant user, as described in more detail herein.

Protocol Buffer Web Tokenization Scheme|Binary-Based Web Tokenization Scheme

In a first implementation, based on a service-default setting, S230 may function to automatically select a binary-based web token tokenization scheme (e.g., a protocol buffer web tokenization scheme or the like) that may be used to digitally construct a digitally signed web token corresponding to a target API request (e.g., a subscriber-initiated API request, etc.). It shall be noted that in such implementation the binary-based web tokenization scheme (e.g., a protocol buffer web tokenization scheme) may be configured as the system or service default/preferred web tokenization scheme.

In a second implementation, S230 may function to automatically select the binary-based web token tokenization scheme (e.g., a protocol buffer web tokenization scheme or the like) from a plurality of distinct web tokenization schemes based on the subscriber-initiated request satisfying one or more characteristics of the binary-based web token tokenization scheme (e.g., a protocol buffer web tokenization scheme or the like).

In one or more embodiments of the second implementation, S230 may function to select the binary-based web tokenization scheme based on detecting or identifying that the subscriber corresponding to the subscriber-initiated request may be classified as a multi-tenant user. In such embodiments, the subscriber corresponding to the subscriber-initiated request may be classified as multi-tenant user if the subscriber (e.g., user) has access and/or user roles (e.g., reading and/or writing roles) to a plurality of distinct organizations (e.g., subscribing companies) and/or microservices (e.g., automated remediations microservice, phishing microservice, manage detection and response microservice, hunting microservice, etc.) of the service or system 100. It shall be noted that selecting the binary-based web tokenization scheme based on determining or identifying that the subscriber-initiated request is associated with a multi-tenant user may prevent a size of an HTTP request and more particularly a size of an HTTP header from exceeding a maximum allowable size (e.g., 4000 characters).

In one or more embodiments of the second implementation, S230 may function to select the binary-based web tokenization scheme based on a service-defined data transfer threshold. For instance, in a non-limiting example, if the service or system 100 implementing the method 200, prefers to transfer digitally signed web tokens between at least two distinct components at a speed below the data transfer threshold, S230 may function to select the binary-based web tokenization scheme as the binary-based web tokenization scheme may minimize a footprint or size of a digitally signed-web token. Accordingly, if the service or system 100 implementing the method 200, prefers to transfer digitally signed web tokens at a speed above the digital token data transfer threshold, S230 may not select the binary-based web tokenization scheme.

In one or more embodiments of the second implementation, S230 may function to select the binary-based web tokenization scheme based on identifying or determining that a majority (or at least a portion) of the microservice components or modules maybe capable of encoding, signing, decoding, and/or validating digitally signed web tokens associated with the binary-based web tokenization scheme.

It shall be noted that the above-described selection criteria are not intended to be limiting and that S230 may function to select the binary-based web tokenization scheme (e.g., protocol buffer web tokenization scheme) based on other selection criterion without departing from the scope of the invention(s).

JSON Web Tokenization Scheme|Text-Based Web Tokenization Scheme

In one or more embodiments, S230 may function to automatically select the JSON web token tokenization scheme (e.g., text-based web tokenization scheme or the like) from a plurality of distinct web tokenization schemes based on the subscriber-initiated request satisfying one or more characteristics of the text-based web token tokenization scheme (e.g., JSON web tokenization scheme or the like).

In one or more embodiments of the second implementation, S230 may function to select the JSON web token tokenization scheme based on identifying or determining that a majority (or at least a portion) of the microservice components or modules maybe capable of encoding, signing, decoding, and/or validating digitally signed web tokens of JSON-type web tokens.

2.40 Constructing a Digitally Signed Web Token

S240, which includes constructing a digitally signed web token, may function to construct or encode a digitally signed web token based on the subscriber-initiated request (e.g., API request or the like) and optionally the selected web tokenization scheme. In one or more embodiments, S240 may function to construct and/or encode a binary-based (digitally signed) web token (e.g., PWT) based on a binary-based web tokenization scheme (e.g., a protocol buffer web tokenization scheme) and/or a JSON web token based on a JSON web tokenization scheme.

It shall be noted that for ease of description in the remainder of S240, disclosure is generally directed to constructing binary-based (digitally signed) web tokens (e.g., digitally signed protobuf web tokens), however, a similar technique and description applies for constructing JSON web tokens.

Constructing a Payload Object of a Protocol Buffer (Protobuf) Web Token

In one or more embodiments, based on receiving a subscriber-initiated request or the like, S240 may function to construct and/or encode a payload object (or component) that may be used in a generation of a digitally signed web token. In such embodiments, S240 may function to generate a payload object that may include one or more claims (e.g., attributes or parameters) associated with the subscriber-initiated request.

For instance, in a non-limiting example, the payload object maybe encoded to include one or more of issuance data (e.g., the principal that will issue the web token, etc.), subject data (e.g., the principal that is the subject of the web token, etc.), audience data (e.g., the recipient(s) that the web token may be intended for, etc.), issued at data (e.g., the time the web token was issued), not before data (e.g., the time before which the web token should not be accepted for processing), token expiration data (e.g., the expiration time on or after which the web token may not be accepted for processing), identifier data (e.g., a unique (collision resistant) identifier of the web token), subscriber data (e.g., authentication data, subscriber username-password pair, API key, etc.) that may be parsed, extracted, or derived from the subscriber-initiated request. It shall be noted that the encoded payload object may include textual data and/or numerical data.

It shall be further noted that additional contextual data or information may be encoded into the payload object or component without departing from the scope of the invention(s).

Figure 3:
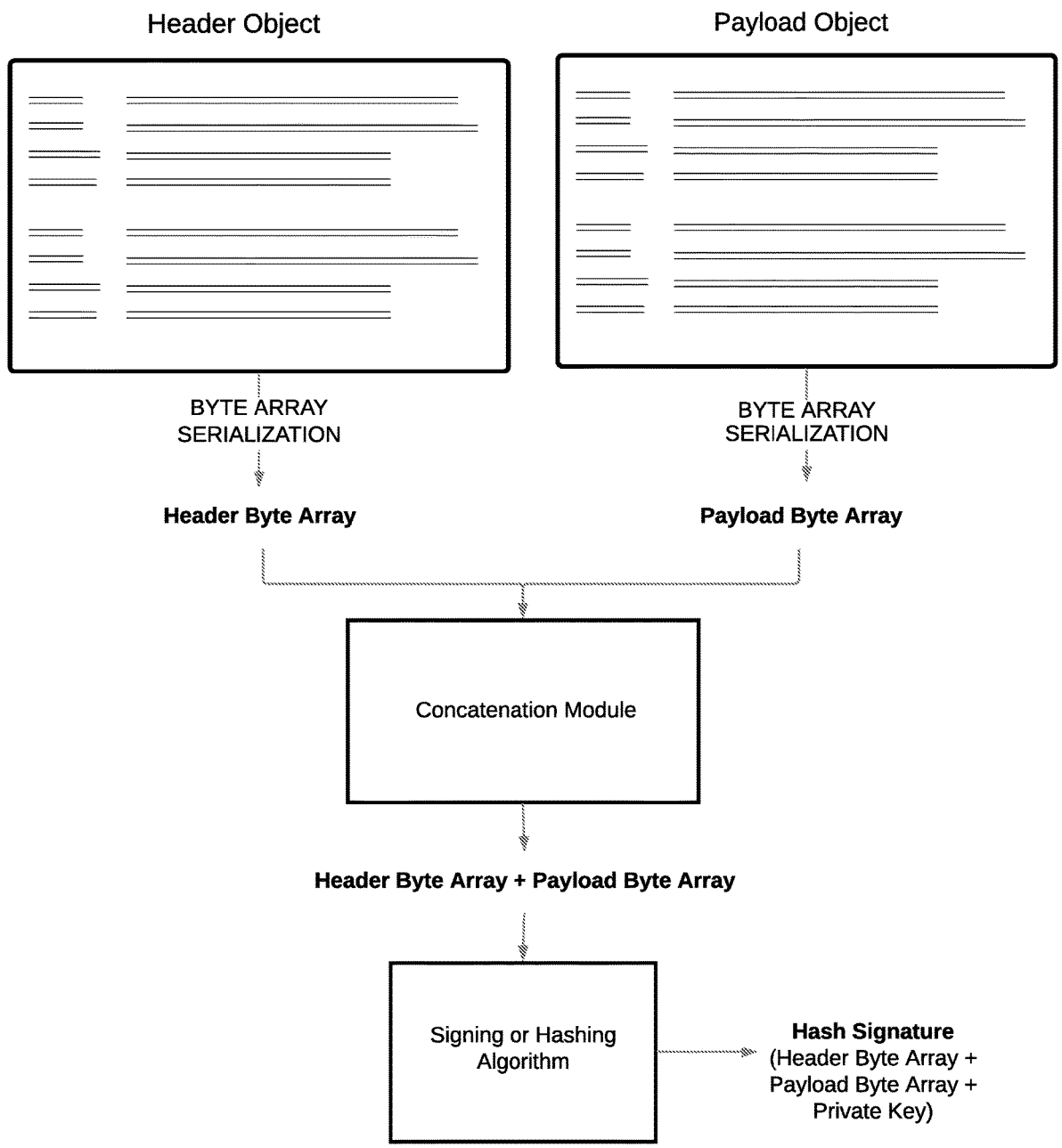
FIG. 3 illustrates an example schematic of generating a hash signature in accordance with one or more embodiments of the present application.
Figure 4:
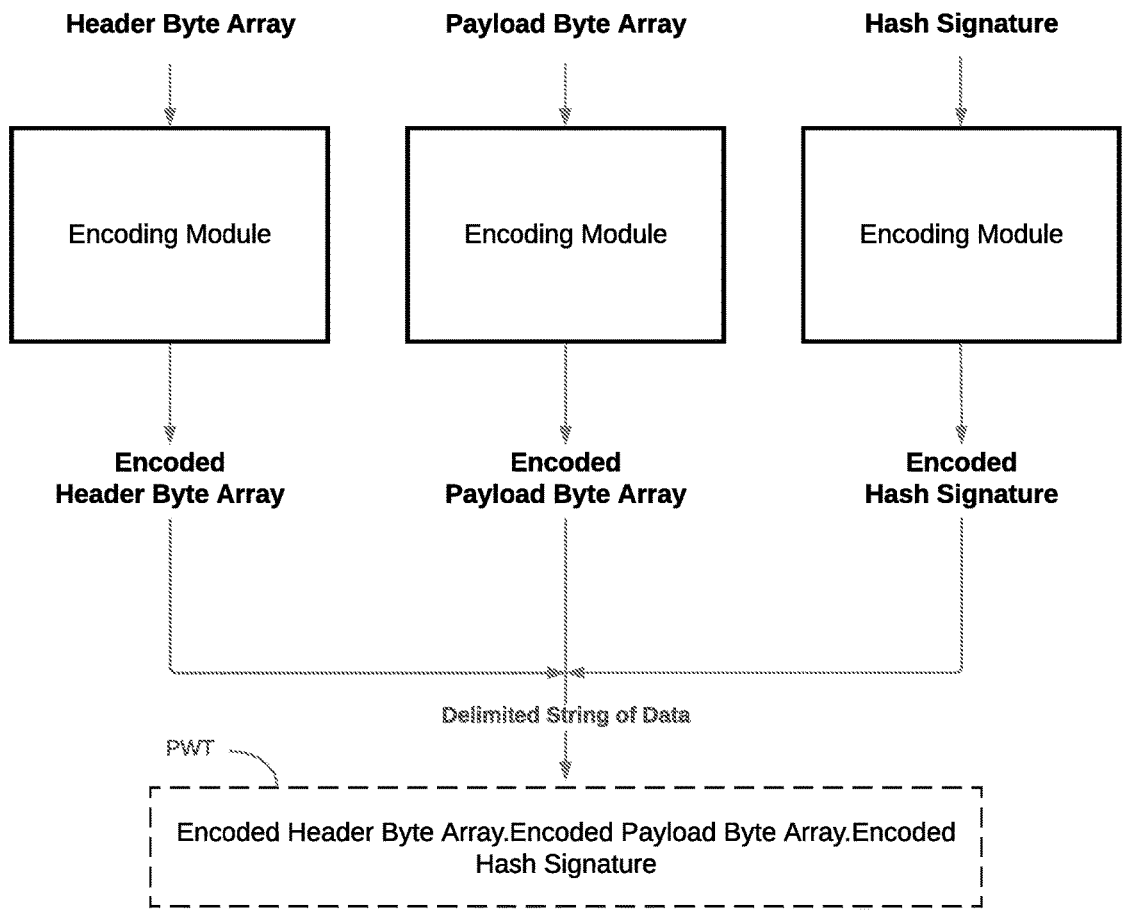
FIG. 4 illustrates an example schematic of constructing a digitally signed protobuf web token (PWT) in accordance with one or more embodiments of the present application.

Accordingly, based on or in response to constructing the payload object, S240 may function to serialize the payload object into a payload byte array (e.g., distinct byte array for the payload), as shown generally by way of example in FIG. 3. It shall be noted that, in some embodiments, S240 may function to serialize the payload object into a payload byte array using any suitable serialization algorithm (e.g., protocol buffers, etc.).

Constructing a Header Object of a Protocol Buffer (Protobuf) Web Token

In one or more embodiments, S240 may function to construct and/or encode a header object (or component) that maybe used by at least a portion of the system or service 100 implementing the method 200 for generating a digitally signed web token. In such embodiments, the header object may be encoded to include decoding and validation instructions that may inform a target microservice component (in receipt of a subject digitally signed web token) of a scheme to decode and/or validate the digitally signed web token.

For instance, in a non-limiting example, the header object may be encoded to include one or more of a target signing (or hashing) algorithm identifier that may be used in a look-up to identify a target signing algorithm (or hashing algorithm) to digitally sign, once constructed, both of the header object and payload object as described in more detail herein, a key identifier value that may be used during a database search or lookup to identify a private or secret key that may be used by the issuer to sign the Protocol Web Token, a name or universe resource identifier (uri) that may be associated with the protobuf definition used during a construction of the header object (or component), and a name or universe resource identifier (uri) that may be associated with the protobuf definition used during a construction of the payload object (or component). It shall be noted that additional contextual data or information may be encoded into the header object or component without departing from the scope of the invention(s).

Accordingly, based on or in response to constructing the header object, S240 may function to serialize the header object into a header byte array (e.g., distinct byte array for the header), as shown generally by way of example in FIG. 3. It shall be noted that, in some embodiments, S240 may function to serialize the header object into a header byte array using any suitable serialization algorithm (e.g., protocol buffers, etc.).

Constructing a Signature Object of a Protocol Web Token

In one or more embodiments, S240 may function to construct a signature object (or component) based on the generated header byte array and the generated payload byte array. It shall be noted that the signature object (or component) may be used by the system or service 100 implementing the method 200 to verify that the sender of the binary-based web token (e.g., PWT) is legitimate or authentic and a message associated with the binary-based web token (e.g., PWT) was not altered or modified.

In one or more embodiments, S240 may function to generate a signature byte array by concatenating or combining the header byte array and the payload byte array. In a first implementation, S240 may function to generate a signature byte array or composite representation of the header byte array and payload byte array by concatenating or combining the payload byte array to the header byte array (e.g., header byte array+payload byte array, the header byte array in front of the payload byte array). Alternatively, in a second implementation, S240 may function to concatenate or combine the header byte array to the payload byte array (e.g., payload byte array+header byte array, the payload byte array in front of the header byte array).

Accordingly, in one or more embodiments, S240 may function to execute, by one or more computers, a subject signing algorithm (e.g., HS256, SHA256, any suitable asymmetrical signing algorithm, any suitable symmetrical signing algorithm, etc.) as specified by the header object or component against the signature byte array. That is, in one or more embodiments, the subject signing (or hashing) algorithm may receive, as input, the signature byte array, process the signature byte array based on attributes of the subject signing algorithm and optionally the private or secret key as specified by the header object, and output a hash-based signature representation of the signature byte array that optionally includes the private or secret key associated with the header object.

Accordingly, in one or more embodiments, S240 may function to encode the header byte array, the payload byte array, and the signature byte array into a target encoding format. For instance, in a non-limiting example, S240 may function to encode the header byte array into a distinct base64url encoding, the payload byte array into a distinct base64url encoding, and the signature byte array into a distinct base 64url encoding.

Accordingly, in one or more embodiments, S240 may function to generate the binary-based digitally signed web token by constructing a (e.g., delimited) string of data that includes the encoded header byte array, the encoded payload byte array, and the encoded digital signature (e.g., <header>.<payload>.<signature>).

Figure 7:
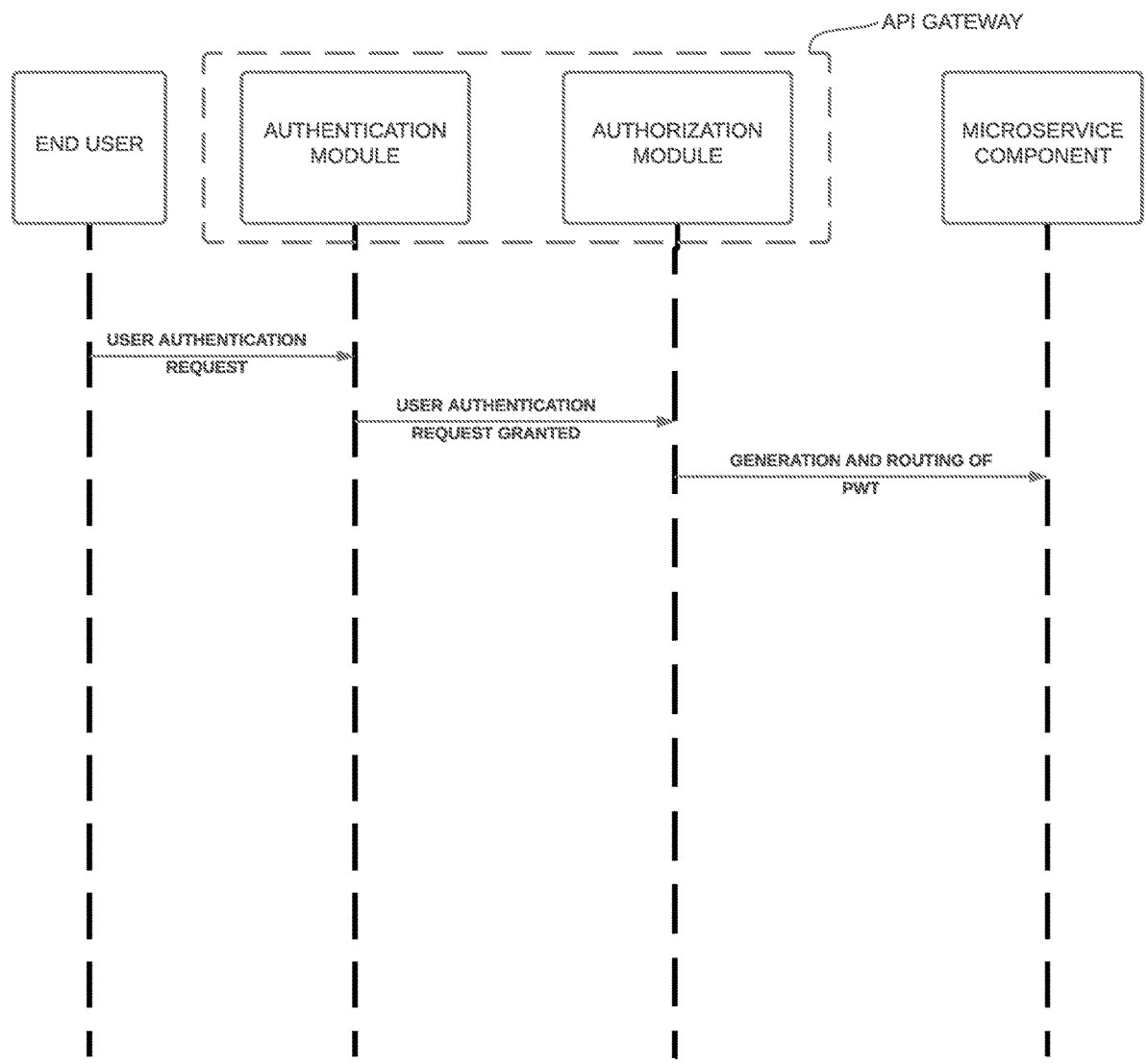
FIG. 7 illustrates an example schematic of generating and routing a digitally signed web token (PWT) to a target microservice component in accordance with one or more embodiments of the present application.

It shall be noted that in a non-limiting example, S240 may function to generate a digitally signed binary-based web token (e.g., PWT, digitally signed protobuf web token) in response to receiving a request from a subscriber attempting to log on to at least a portion of the system or service 100, as shown generally by way of example in FIG. 7. In such a non-limiting example, the request (may include an application programming interface key and/or a username and password pair) and routed to an application programming interface (API) gateway. The API gateway may attempt to authenticate the request and based on successfully authenticating the request, the request may be routed, via an API call, to an authorization module of the API gateway. Accordingly, based on the subscriber request satisfying one or more criteria of the authorization module, the authorization module may function to generate a binary-based web token (e.g., PWT) in analogous ways as described above.

Example Application of Constructing a Digitally Signed Protobuf Web Token

In one or more embodiments, a system or service implementing the method 200 may function to identify, via an application programming interface (API) gateway, an API request that includes an authorization header comprising authentication data. In such embodiments, an authentication service (e.g., authentication component, etc.) of the API gateway may function to (e.g., automatically) assess the authentication data of the API request against a corpus of valid authentication data of the cybersecurity event detection and response service based on the identifying of the API request. Accordingly, in some embodiments, the authentication service of the API gateway may identify the authentication data as valid authentication data and/or a target entity that corresponds to the authentication data based on the assessment of the authentication data against the corpus of valid authentication data.

In one or more embodiments, via an authorization service of the API gateway, the system or service implementing the method 200 may function to obtain a set of permissions that the target entity is authorized to perform within the cybersecurity event detection and response service based on searching a corpus of authorization data using an identifier of the target entity as a search parameter. Accordingly, based on obtaining the set of permissions associated with the target entity, the authorization service of the API gateway may function to generate a digitally signed protobuf web token that includes a representation of the target entity and/or a representation of the set of permissions associated with the target entity (e.g., the payload object of the digitally signed protobuf web token is encoded to include the representation of the target entity and/or the representation of the set of permissions associated with the target entity). It shall be recognized that the target entity may be a user, an API client, a service account, and/or the like.

In one or more embodiments, the authentication data of the API request may include an API key. Accordingly, the assessment of the authentication data against the corpus of valid authentication data, in one or more embodiments, may include assessing the API key against a list of valid API keys stored in the corpus of valid authentication data. Accordingly, the identification of the authentication data as valid authentication data, in one or more embodiments may be based on an (e.g., automatic) determination that the API key is equivalent to one of the valid API keys of the list of valid API keys. It shall be recognized that each valid API key of the list of valid API keys corresponds to a distinct entity subscribing to the cybersecurity event detection and response service and may be authorized for use within the cybersecurity event detection and response service.

In one or more embodiments, the authentication data of the API request may include a username-password pair. The assessment of the authentication data against the corpus of valid authentication data, in one or more embodiments, may include assessing the username-password pair against a list of valid username-password pairs stored in the corpus of valid authentication data. Accordingly, the assessment of the authentication data against the corpus of valid authentication data may include assessing the username-password pair against a list of valid username-password pairs stored in the corpus of valid authentication data. Accordingly, the identification of the authentication data as valid authentication data, in one or more embodiments, may be based on an (e.g., automatic) determination that the username-password pair is equivalent to one of the valid username-password pairs of the list of valid username-password pairs.

Stated another way, in one or more embodiments, the corpus of valid authentication data may include one or more pieces of genuine authentication data of each subscriber associated with the cybersecurity event detection and response service. Accordingly, each of the one or more pieces of genuine authentication data may provide a subject subscriber a capability of accessing at least a portion of the cybersecurity event detection and response service.

In one or more embodiments, the generation of the digitally signed protobuf web token may include (e.g., automatically) generating a header object. In such embodiments, generating the header object may include encoding the header object based on a protobuf-header encoding protocol defined by the authorization service of the API gateway. It shall be noted that the header object, when encoded, may include instructions for a downstream service or downstream component of the cybersecurity event detection and response service to decode and validate the digitally signed protobuf web token. Additionally, in some embodiments, the header object may be serialized into a header byte array using any suitable serialization algorithm.

In one or more embodiments, the generation of the digitally signed protobuf web token may include (e.g., automatically) generating a payload object. In such embodiments, generating the payload object may include encoding the payload object based on a protobuf-payload encoding protocol defined by the authorization service of the API gateway. It shall be noted that the payload object, when encoded, may include the representation of the target entity and/or the representation of the set of permissions associated with the target entity. Additionally, in some embodiments, the payload object may be serialized into a payload byte array using any suitable serialization algorithm.

In one or more embodiments, the generation of the digitally signed protobuf web token may include generating a signature object. In such embodiments, generating the signature object may include generating a signature byte array based on a concatenation of the serialized header byte array and the serialized payload byte array. Additionally, in some embodiments, a cryptographic signature of the signature byte array may be generated based on providing, as input, the signature byte array to a target signing algorithm (e.g., an asymmetrical signing algorithm, a symmetrical signing algorithm, etc).

In one or more embodiments, the authorization service of the API gateway may function to generate an encoded header based on providing the serialized header byte array, as input, to a target encoding algorithm (e.g., base64url encoding algorithm). Additionally, in some embodiments, the authorization service of the API gateway may function to generate an encoded payload based on providing the serialized payload byte array, as input, to the target encoding algorithm (e.g., base64url encoding algorithm). Additionally, in some embodiments, the authorization service of the API gateway may function to generate an encoded signature based on providing the cryptographic signature, as input, to the target encoding algorithm (e.g., base64url encoding algorithm). Accordingly, the digitally signed protobuf web token may include the encoded header, the encoded payload, and the encoded signature, as shown generally by way of example in FIGS. 3-5.

2.50 Routing and Validating a Digitally Signed API Request

S250, which includes routing and validating a digitally signed API request, may function to route the digitally signed API request to one or more target microservice components of the cybersecurity event detection and response service and validate the digitally signed API request at the one or more target microservice components. In one or more embodiments, a digitally signed API request, as generally referred to herein, may be an API call that includes a digitally signed web token.

In one or more embodiments, S250 may function to configure a digitally signed API request that includes the digitally signed web token constructed by S240 and one or more routing parameters. In a first implementation, S250 may function to generate a digitally signed API call (e.g., request) that includes the digitally signed web token of S240 in one of the header object and the payload object. In a second implementation, S250 may function to augment a pre-existing request to include the digitally signed web token constructed by S240 in one of the header object and a payload object.

For instance, with continued reference to the above-described non-limiting example, based on the generation of the digitally signed protobuf web token, a system or service implementing the method 200 (e.g., the authorization service of the API gateway, etc.) may (e.g., automatically) adapt, via one or more processors, the API request to an adapted API request (e.g., digitally signed API request, etc) that includes a header component comprising the digitally signed protobuf web token.

In one or more embodiments, S250 may function to route the digitally signed API request (e.g., adapted API request or the like) to one or more target microservice components (e.g., an upstream microservice component, a downstream microservice component, etc.) based on the specified routing parameters of the digitally signed API request. In such embodiments and based on one or more microservice components receiving the digitally signed API request, S250 may function to validate the digitally signed web token included within the digitally signed API request prior to subsequent processing or execution by the one or more microservice components as described in more detail below.

For instance, with continued reference to the above-described non-limiting example, the system or service implementing the method 200 (e.g., the authorization service of the API gateway, etc.) may function to transmit, via a network, the adapted API request to a target API-processing service of the cybersecurity event detection and response service that automatically processes or automatically handles the adapted API request. In one or more embodiments of such non-limiting example, the target API-processing service may function to automatically determine the digitally signed protobuf web token as a valid web token based on the digitally signed protobuf web token satisfying web token decoding and validation criteria defined by the target API-processing service. Accordingly, in some embodiments, the target API-processing service may function to automatically process or automatically handle the adapted API request based on the automatic determination.

In one or more embodiments, based on the target API-processing service receiving the adapted API request, the target API-processing service may function to automatically decode and validate the digitally signed protobuf web token using a set of computer-executable protobuf web token decoding and validation instructions of the target API-processing service. It shall be noted that, in such embodiments, the target API-processing service may be configured to perform the decoding and validating of the digitally signed protobuf web token without creating a subsequent API request to another internal service component and/or external service component of the cybersecurity event detection and response service.

In one or more embodiments, based on the target API-processing service determining the digitally signed protobuf web token as valid, the target API-processing service may function to execute the adapted API request. In such embodiments, based on executing the adapted API request, the system or service may function to enable the target entity access to a plurality of tenants of the cybersecurity event detection and response service.

Additionally, or alternatively, in one or more embodiments, based on the target API-processing service determining the digitally signed protobuf web token as valid, the target API-processing service may function to execute the adapted API request. In such embodiments, based on executing the adapted API request, the system or service may function to selectively return a corpus of security data based on a context of the adapted API request, as described in U.S. patent application Ser. No. 17/488,800, filed on Sep. 29, 2021, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated herein in its entirety by this reference.

Additionally, or alternatively, in one or more embodiments, based on the target API-processing service determining the digitally signed protobuf web token as valid, the target API-processing service may function to execute the adapted API request. In such embodiments, based on executing the adapted API request, the system or service may function to automatically mitigate a compromised digital asset of the target entity that resolves or mitigates a cybersecurity threat associated with the compromised digital asset, as described in U.S. patent application Ser. No. 18/123,137, filed on 17 Mar. 2023, titled SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM, which is incorporated herein in its entirety by this reference.

Token Decoding and Validation Scheme

In one or more embodiments, the one or more microservices components may function to validate the digitally signed web token to confirm that one or components of the digitally signed web token was not modified or adjusted with respect to when the system or service 100 issued the digitally signed web token (e.g., PWT). Stated another way, based on a routing of a digitally signed web token to a target microservice component, the target microservice component may function to decode and validate the digitally signed web token (e.g., PWT).

In one or more embodiments, S250 may function to encode a subset of microservice components of the cybersecurity event detection and response service with a set of computer-executable web token decoding and validation instructions that provides each microservice component of the subset of microservice components a capability of decoding and validating one or more digitally signed web tokens (e.g., digitally signed protobuf web tokens). For instance, in a non-limiting example, based on encoding a first microservice component (e.g., a target API-processing service) with a first set of computer-executable (e.g., PWT) web token decoding and validation instructions, the first microservice component may be configured to automatically decode and validate a digitally signed protobuf web token based on the first set of computer-executable (e.g., PWT) web token decoding and validation instructions.

In one or more embodiments, based on using one or more token decoding and token validation programming libraries (e.g., computer-executable web token decoding and validation instructions), the one or more microservice components may function to segment or split the digitally signed web token into distinct constitutional or foundational elements that form the digitally signed web token (e.g., <header>.<payload>.<signature>→<header>  <payload> <signature>), as shown generally by way of example in FIG. 5 and FIG. 6. For instance, in a non-limiting example, a subject binary-based digitally signed web token (e.g., PWT) may include a (e.g., delimited) string of data that includes the distinct header object, the distinct payload object, and the distinct signature object and the one or more microservice components may function to split or partition the subject binary-based digitally signed web token into (e.g., three (3)) distinct parts or components.

In one or more embodiments and with continued reference to the above-described embodiment, the one or more microservices may function to decode the encoded header (e.g., base64url encoded header) into a header byte array and deserialize the header byte array that may enable an identification of a signing or hashing algorithm and the private or secret key. It shall be noted that if the signing or hashing algorithm and the private or secret key are non-identifiable or invalid the one or more microservices may reject the subject digitally signed web token (e.g., terminate a processing of the subscriber-initiated request).

In one or more embodiments and with continued reference to the above-described embodiment, the one or more microservice components may function to decode the encoded payload (e.g., base64url encoded payload) into a payload byte array and the one or more microservices may function to decode the encoded signature (e.g., base64url encoded signature) into a signature byte array.

Accordingly, the one or more microservice components may function to concatenate the header byte array and the payload byte array to generate a proxy signature. In such embodiments, the one or more microservice components may compare the proxy signature with the baseline or original signature of the binary-based digitally signed web token included in the digitally signed API request for equivalency. It shall be noted that if the proxy signature and the baseline signature are different (e.g., not equivalent the one or more microservice components may reject the subject digitally signed web token (e.g., terminate a processing of an active request). It shall be noted that if the proxy signature and the baseline signature are different the characteristics of one of the header object and the payload object may have been modified.

Conversely, if the proxy signature and the baseline signature are the same (e.g., equivalent) the one or more microservice components may accept the subject digitally signed web token (e.g., continue a processing of an active request).

Additionally, in one or more embodiments, the one or more microservice components may function to deserialize the payload byte array into a Protobuf object to identify token expiration data. It shall be noted that if the current date/time is greater than the token expiration data (e.g., expiration date data) the one or more microservice components may reject the subject digitally signed web token (e.g., terminate a processing of an active request).

Additionally, in one or more embodiments, the one or more microservice components may function to deserialize the header byte array and/or the payload byte array into distinct Protobuf objects using a corresponding protobuf definition. For example, in a non-limiting example, S250 may function to deserialize a header byte array of a subject PWT into a protobuf header object using a target header Protobuf definition. In another non-limiting example, S250 may function to deserialize a payload byte array of a subject PWT into a protobuf payload object using a target payload Protobuf definition. It shall be noted that if the Protobuf objects are non-identifiable or invalid based on the deserialization the one or more microservices may reject the subject digitally signed web token (e.g., terminate a processing of the subscriber-initiated request).

Figure 8:
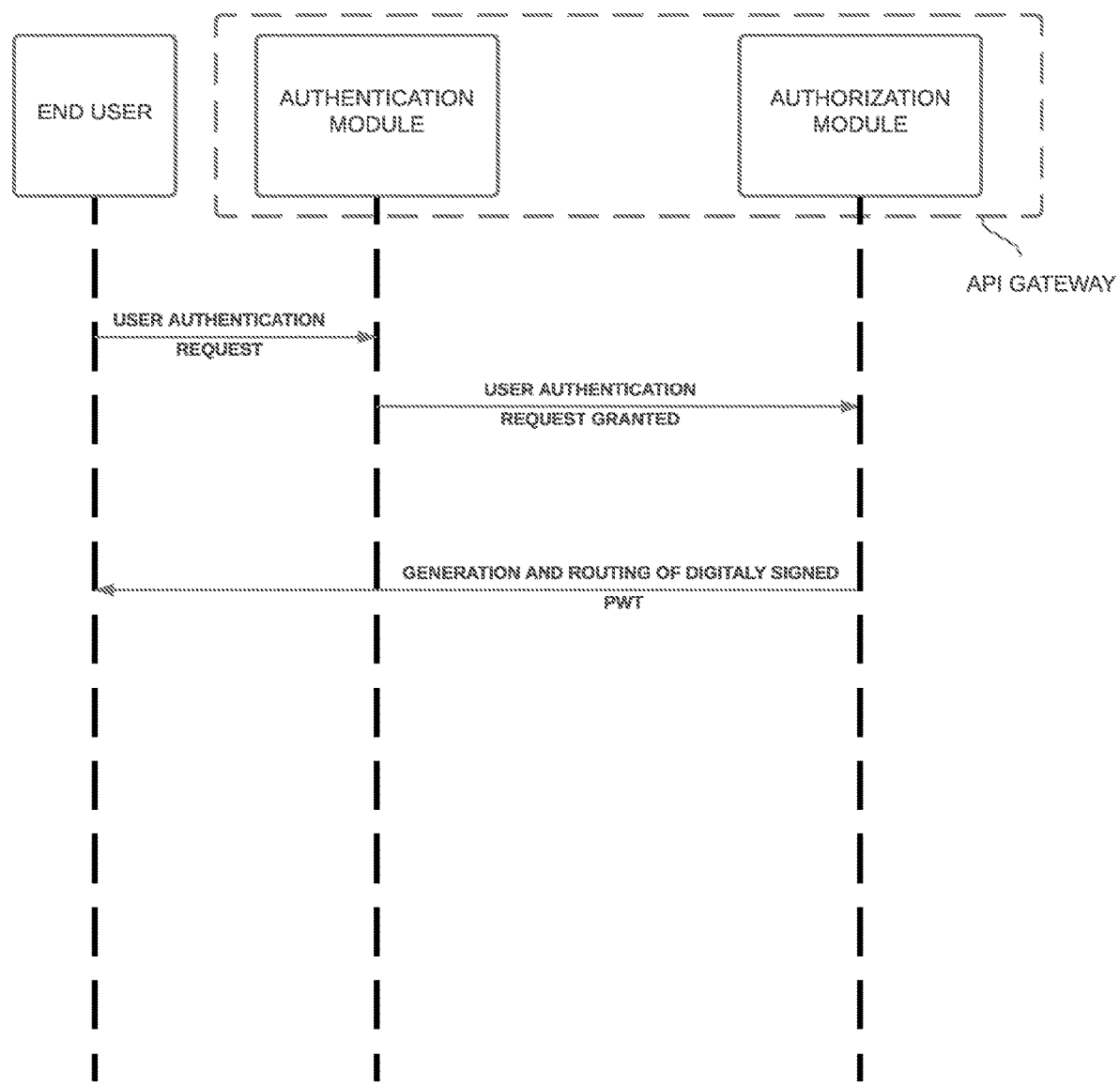
FIG. 8 illustrates an example schematic of generating and transmitting a digitally signed web token (PWT) to an end user in accordance with one or more embodiments of the present application.

It shall be noted that in one or more embodiments, a PWT-type web token may be routed to the subscriber (e.g., end user) and used for subsequent API calls to accelerate an authentication and authorization process as the web token includes authentication and/or authorization data, as shown generally by way of example in FIG. 8.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A method comprising:
receiving, via an application programming interface (API) gateway, an API request that includes an authorization header comprising authentication data;
identifying, via an authentication service, a target entity that corresponds to the authentication data based on confirming an authenticity of the authentication data;
obtaining, via an authorization service, a set of permissions that the target entity is allowed to perform within a target online service;
generating, at the authorization service, a digitally signed protobuf web token based on (i) the target entity and (ii) the set of permissions associated with the target entity, wherein generating the digitally signed protobuf web token includes:
generating a header object, wherein generating the header object includes encoding the header object based on a protobuf-header encoding protocol defined by the authorization service, wherein the header object, when encoded, includes instructions for a downstream service or downstream component of the target online service to decode and validate the digitally signed protobuf web token, and
serializing, via a serialization algorithm, the header object into a serialized header byte array; and
in response to generating the digitally signed protobuf web token:
adapting the API request to an adapted API request, wherein the adapted API request includes a header component comprising the digitally signed protobuf web token; and
transmitting, via a network, the adapted API request to a target API-processing service that automatically processes or automatically handles the adapted API request.

2. The method according to claim 1, wherein:
confirming the authenticity of the authentication data includes:
assessing, via the authentication service, the authentication data of the API request against a repository of valid authentication data of the target online service.

3. The method according to claim 2, wherein:
the repository of valid authentication data includes one or more pieces of genuine authentication data of each subscriber associated with the target online service, and
each of the one or more pieces of genuine authentication data provides a subject subscriber a capability of accessing at least a portion of the target online service.

4. The method according to claim 2, wherein:
the authentication data includes an API key associated with the target entity,
the repository of valid authentication data includes a set of valid API keys, and
confirming the authenticity of the authentication data includes comparing the API key associated with the target entity against the set of valid API keys.

5. The method according to claim 4, wherein:
each valid API key of the set of valid API keys corresponds to a distinct entity subscribing to the target online service and is authorized for use within the target online service.

6. The method according to claim 1, wherein:
generating the digitally signed protobuf web token further includes generating a payload object, wherein generating the payload object includes:
encoding the payload object based on a protobuf-payload encoding protocol defined by the authorization service, wherein the payload object, when encoded, includes a representation of the target entity and a representation of the set of permissions associated with the target entity;
the method further includes:
serializing, via the serialization algorithm, the payload object into a serialized payload byte array.

7. The method according to claim 6, wherein:
generating the digitally signed protobuf web token further includes generating a signature object, wherein generating the signature object includes:
generating a signature byte array based on a concatenation of the serialized header byte array and the serialized payload byte array;
the method further includes:
generating a cryptographic signature of the signature byte array based on providing, as input, the signature byte array to a target asymmetrical signing algorithm.

8. The method according to claim 7, further comprising:
generating an encoded header based on providing the serialized header byte array, as input, to a target encoding algorithm;
generating an encoded payload based on providing the serialized payload byte array, as input, to the target encoding algorithm; and
generating an encoded signature based on providing the cryptographic signature, as input, to the target encoding algorithm, wherein the digitally signed protobuf web token includes the encoded header, the encoded payload, and the encoded signature.

9. The method according to claim 1, further comprising:
automatically determining, via the target API-processing service, the digitally signed protobuf web token is a valid web token based on the digitally signed protobuf web token satisfying web token decoding and validation criteria defined by the target API-processing service.

10. The method according to claim 1, wherein:
the target entity corresponds to one of a user, an API client, and a service account.

11. The method according to claim 1, wherein:
the set of permissions includes a plurality of read and write permissions granted to the target entity.

12. A computer-implemented method comprising:
at an event detection and response service:
obtaining an application programming interface (API) request that includes an authorization header comprising authentication data;
identifying (a) the authentication data as valid authentication data and (b) a target entity that corresponds to the authentication data based on an assessment of the authentication data against a corpus of valid authentication data;
obtaining a set of permissions that the target entity is authorized to perform within the event detection and response service based on querying a repository of authorization data;
generating a digitally signed protobuf web token based on (i) the target entity and (ii) the set of permissions, wherein generating the digitally signed protobuf web token includes:
generating a header object, wherein generating the header object includes encoding the header object based on a protobuf-header encoding protocol defined by an authorization service associated with the event detection and response service, wherein the header object, when encoded, includes instructions for a downstream service or downstream component of the event detection and response service to decode and validate the digitally signed protobuf web token, and serializing, via a serialization algorithm, the header object into a serialized header byte array; and based on generating the digitally signed protobuf web token:

adapting the API request to an adapted API request, wherein the adapted API request includes a header component comprising the digitally signed protobuf web token; and transmitting, via a network, the adapted API request to a target API-processing service.

13. The computer-implemented method according to claim 12, wherein:

generating the digitally signed protobuf web token further includes generating a payload object, wherein generating the payload object includes:

encoding the payload object based on a protobuf-payload encoding protocol defined by the authorization service, wherein the payload object, when encoded, includes a representation of the target entity and a representation of the set of permissions associated with the target entity;

the computer-implemented method further includes:

serializing, via the serialization algorithm, the payload object into a serialized payload byte array.

14. The computer-implemented method according to claim 13, wherein:

generating the digitally signed protobuf web token further includes generating a signature object, wherein generating the signature object includes:

generating a signature byte array based on a concatenation of the serialized header byte array and the serialized payload byte array;

the computer-implemented method further includes:

generating a cryptographic signature of the signature byte array based on providing, as input, the signature byte array to a target asymmetrical signing algorithm.

15. The computer-implemented method according to claim 14, further comprising:

generating an encoded header based on providing the serialized header byte array, as input, to a target encoding algorithm;

generating an encoded payload based on providing the serialized payload byte array, as input, to the target encoding algorithm; and generating an encoded signature based on providing the cryptographic signature, as input, to the target encoding algorithm, wherein the digitally signed protobuf web token includes the encoded header, the encoded payload, and the encoded signature.

16. A method for using digitally signed web tokens within an event detection and response service, the method comprising:

detecting, via an application programming interface (API) gateway, an API request that includes an authorization header comprising authentication data;

obtaining, via an authorization service of the API gateway, a set of permissions that a target entity associated with the API request is authorized to perform within the event detection and response service;

generating, at the authorization service of the API gateway, a digitally signed protobuf web token that includes (1) a representation of the target entity and (2) a representation of the set of permissions granted to the target entity, wherein generating the digitally signed protobuf web token includes:

generating a header object, wherein generating the header object includes encoding the header object based on a protobuf-header encoding protocol defined by the authorization service, wherein the header object, when encoded, includes instructions for a downstream service or downstream component of the event detection and response service to decode and validate the digitally signed protobuf web token, and serializing, via a serialization algorithm, the header object into a serialized header byte array; and based on generating the digitally signed protobuf web token:

adapting, via one or more processors, the API request to an adapted API request, wherein the adapted API request includes a header component comprising the digitally signed protobuf web token; and transmitting, via a network, the adapted API request to a target API-processing service that automatically processes or automatically handles the adapted API request.

17. The method according to claim 16, wherein:

generating the digitally signed protobuf web token further includes selecting a target web tokenization scheme of a plurality of distinct web tokenization schemes based on one or more characteristics of the target entity;

the method further comprises:

using the target web tokenization scheme to generate the digitally signed protobuf web token.

18. The method according to claim 16, wherein:

generating the digitally signed protobuf web token further includes selecting a target web tokenization scheme of a plurality of distinct web tokenization schemes based on one or more characteristics of the API request;

the method further comprises:

using the target web tokenization scheme to generate the digitally signed protobuf web token.

* * * * *